United States Patent
Frick et al.

(10) Patent No.: US 6,354,118 B1
(45) Date of Patent: Mar. 12, 2002

(54) ARRANGEMENT FOR ELECTRICALLY LOCKING THE STEERING SHAFT OF A MOTOR VEHICLE STEERING DEVICE

(75) Inventors: Alexander Frick, Augsburg; Andreas Berger, Petershausen; Mario Pieh, Marktbreit; Joachim Engelmann, Ratingen; Kurt Lieb, Seligenstadt; Thomas Quellmalz, Darmstadt; Hagen Friedrich, Indersdorf; Harald Starken, Erdweg, all of (DE)

(73) Assignee: Valeo GmbH& Co.Scherheitssysteme, Erdweg (DE)

( * ) Notice: Subject to any disclaimer, the term of this patent is extended or adjusted under 35 U.S.C. 154(b) by 0 days.

(21) Appl. No.: 09/504,284

(22) Filed: Feb. 15, 2000

(51) Int. Cl.⁷ .............................................. B60R 25/02
(52) U.S. Cl. ......................................... 70/186; 70/252
(58) Field of Search .................. 70/210, 237, 181–187, 70/190, 245–247, 252

(56) References Cited

U.S. PATENT DOCUMENTS

| | | | |
|---|---|---|---|
| 2,964,935 A | * 12/1960 | Lombardi | 70/252 |
| 3,680,335 A | * 8/1972 | Onishi | 70/252 |
| 3,903,986 A | * 9/1975 | Smith | 70/252 X |
| 4,250,976 A | * 2/1981 | Mochida | 70/252 X |
| 4,332,306 A | * 6/1982 | Turatti | 70/252 X |
| 4,552,000 A | * 11/1985 | Lipschutz | 70/185 |
| 4,716,748 A | * 1/1988 | Watanuki et al. | 70/252 |
| 5,197,312 A | * 3/1993 | Akutsu | 70/247 |
| 5,454,238 A | * 10/1995 | Ross et al. | 70/186 |
| 5,656,867 A | * 8/1997 | Kokubu | 70/252 X |
| 5,718,132 A | * 2/1998 | Riefe et al. | 70/186 |
| 5,896,765 A | * 4/1999 | Peyre et al. | 70/186 |
| 5,965,955 A | * 10/1999 | Takanohashi | 70/252 X |
| 6,125,671 A | * 10/2000 | Suzuki | 70/186 |
| 6,233,986 B1 | * 5/2001 | Suzuki et al. | 70/186 |

FOREIGN PATENT DOCUMENTS

| | | |
|---|---|---|
| DE | 196 21 326 | 10/1997 |
| EP | 0 721 869 | 7/1996 |

* cited by examiner

*Primary Examiner*—Suzanne Dino Barrett
(74) *Attorney, Agent, or Firm*—Morgan&Finnegan, LLP

(57) ABSTRACT

A device for electrically locking the steering shaft of a motor vehicle steering device, which comprises an electric motor with actuator connected downstream, for displacing a blocking element which is arranged so that it can be displaced from its unlocked position into its locked position, and a switching device fore activating the electric motor. To ensure that the arrangement can be of very compact design and can be fitted without major changes in vehicles produced by different manufacturers, the invention proposes that the arrangement be composed of two separate subassemblies: a locking device with a first housing, in which the electric motor with actuator connected downstream and the blocking element is arranged, and manufacturer-specific electronic switching device, which can be attached o the outside of the first housing.

9 Claims, 2 Drawing Sheets

ARRANGEMENT FOR ELECTRICALLY LOCKING THE STEERING SHAFT OF A MOTOR VEHICLE STEERING DEVICE

BACKGROUND OF THE INVENTION

The invention relates to an arrangement for electrically locking the steering shaft of a motor vehicle steering device.

Known arrangements of this nature usually comprise an electric motor which is arranged in a housing and has an actuator connected downstream for displacing a blocking element from its locked position into its unlocked position and vice versa. In such arrangements, the blocking element, in its locked position, engages, for example, in the recess, formed by adjacent teeth, in a toothed ring attached to the steering shaft and thus blocks the steering shaft. In the known arrangements, an electronic switching arrangement is provided for (coded) activation of the corresponding electric motor or of the other electrical or electronic units (e.g. the position sensors), which switching arrangement is located inside the housing of the arrangement and, via electric lines, is connected to a power source which is at a distance from the arrangement and/or to a control arrangement of the vehicle.

A drawback of the known arrangements is that they are relatively expensive to produce, since individual vehicle manufacturers generally use different control electronics and different plug connections which are molded integrally on the housing, so that housings which are in each case specially adapted to the corresponding vehicles, and sometimes also special transmission arrangements, are required. Moreover, due to the integrated control electronics, the housings require a relatively large structural space. Finally, in these known arrangements, subsequent removal and refitting of the switching arrangement, which may be required for repair purposes, for example, is extremely time-consuming.

BRIEF SUMMARY OF THE INVENTION

The invention is based on the object of providing an arrangement for electrically locking the steering shaft of a motor vehicle steering device, which arrangement is of compact design and can be used without major changes in vehicles produced by different manufacturers.

According to the invention, this object is achieved by means of the features of claim 1. Further, particularly advantageous configurations of the invention are disclosed by the subclaims.

The invention is fundamentally based on the principle of constructing the arrangement from two separate subassemblies: a locking device with a first housing, in which the electric motor with actuator connected downstream and blocking element is arranged, and an electronic switching device, which can be attached to the outside of the housing of the locking device.

If the arrangement according to the invention is made modular in this way, the locking device can easily be constructed as a standard module which can be used in a large number of different vehicles. By contrast, the switching device, which can be attached to the outside of the locking device, is manufacturer-specific.

In order to prevent the arrangement according to the invention from being interfered with, the switching device also has a suitable second housing, in which the actual electronics are arranged and which covers the electrical connection between switching device and locking device with respect to the outside.

It has proven particularly advantageous for the electrical connection between the locking device and the switching device to be formed by a plug connection, so that the switching device can easily be exchanged after it has been fitted. For this purpose, the switching device may, for example, be designed as a connector.

In an advantageous embodiment of the invention, the switching device and the locking device are connected to one another by means of locking elements, in such a manner that the two subassemblies cannot be separated from one another when the blocking element of the locking device is in its locked position.

To make the design of the locking device as compact as possible, it has proven advantageous for the actuator used to be a spindle drive with a threaded spindle which is connected by means of a toothed transmission and drives a driver mounted so that it can be displaced in linear fashion in a guide. This driver is connected to the blocking element in a manner known per se, by means of a spring.

Moreover, to guide the blocking element, the locking device comprises an adapter part which can be connected to the steering device of the vehicle and is designed in such a manner that, in the event of the steering shaft being twisted violently in the locked position of the blocking element, it absorbs the forces acting on this part.

In order for it to be possible, if appropriate, to adapt the arrangement according to the invention in a simple manner to vehicles produced by different manufacturers by mechanical means, it has proven advantageous for the adapter part and the blocking element to be arranged exchangeably on the locking device.

BRIEF DESCRIPTION OF THE DRAWINGS

Further details and advantages of the invention will emerge from the following exemplary embodiments explained with reference to figures, in which.

DETAILED DESCRIPTION OF THE INVENTION

Figure 1:
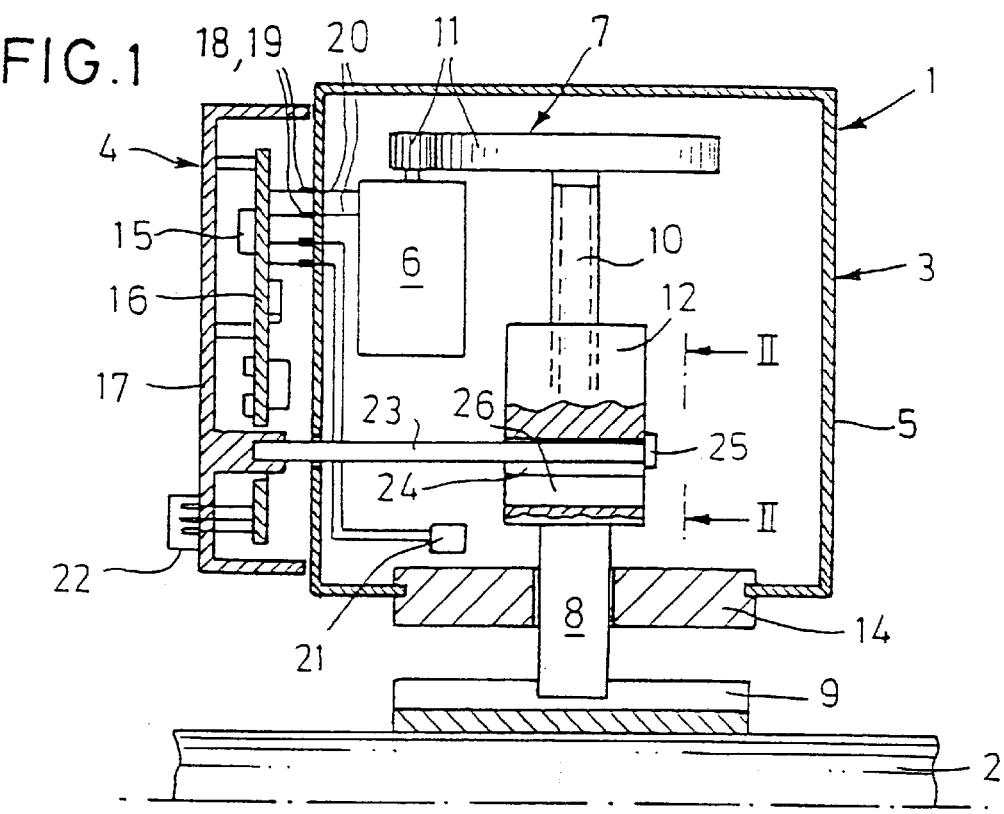
FIG. 1 shows a longitudinal section through an arrangement according to the invention, having a locking device and an electronic switching device.

In FIG. 1, 1 denotes an arrangement according to the invention for electrically locking a steering shaft 2 of a motor vehicle steering device, which essentially comprises a locking device 3 and an electronic switching device 4.

The locking device 3 comprises a first housing 5 (made from plastic, for example) and an electric motor 6, which is arranged in the housing 5 and has a spindle drive 7 connected downstream, for displacing a blocking element 8. In its locked position which is shown in FIG. 1, the blocking element 8 engages in a toothed ring 9 which is attached to the steering shaft 2.

The spindle drive 7 comprises a threaded spindle 10, which is driven by the electric motor 6 via a toothed transmission 11, and a driver 12, which is mounted in a guide and has an internal screw thread which engages in the screw thread of the threaded spindle 10.

Figure 3:
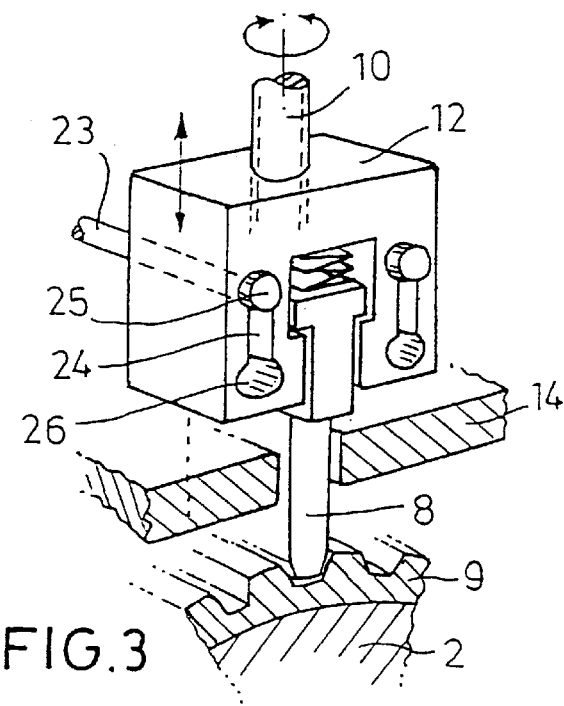
FIG. 3 shows a perspective view of a partial area of the locking device shown in FIG. 1.

On its side facing toward the blocking element 8, the driver 12 has a seat 13, by means of which the blocking element 8, on its side which is remote from the steering shaft 2, is exchangeably connected to the driver 12 (FIG. 3).

Moreover, to guide the blocking element 8, the locking device 3 comprises an adapter part 14 which can be connected to the first housing 5 and the steering device of the vehicle and via which the locking device 3 can be attached to the steering device. The adapter part 14 is designed in such a manner that, in the event of the steering shaft 2 being twisted violently in the locked position of the blocking element 8, it absorbs the forces acting on this part. The adapter part 14 may be attached to the steering device by means, for example, of a screw, which is not shown for the sake of clarity.

The electronic switching device 4 comprises a printed-circuit board 16 which is populated with corresponding components 15 and is secured in a second housing 17. On its side which faces toward the locking device 3, the switching device 4 has contacts 18 which are connected to corresponding contacts 19 attached to the first housing 5, in the form of a plug connection. The contacts 19 are connected to the electric motor 6 and a position sensor 21 (Hall Sensor), which detects the locked position of the blocking element 8, via electric lines 20.

Furthermore, an integrally formed plug connection 22 is provided on the second housing 17, via which connection the electronic switching device 4 can be connected, by means of electric lines (not shown), to a power source (battery), which is at a distance from the locking device, and/or a central control arrangement of the vehicle.

The switching device 4 is on one side connected to the locking device 3 releasable, for example by means of clips (not shown), and on the other side by means of two locking elements 23. The latter are attached to the second housing 17 on their side facing toward the switching device 4. On their side facing toward the locking device 3, the locking elements 23 are guided laterally through slot-shaped openings 24 in the driver 12 and, in the locked position of the blocking element 8, cannot be pulled out of these openings, so that in this position of the blocking element 8 it is also impossible for the second housing 17 to be removed.

Figure 2:
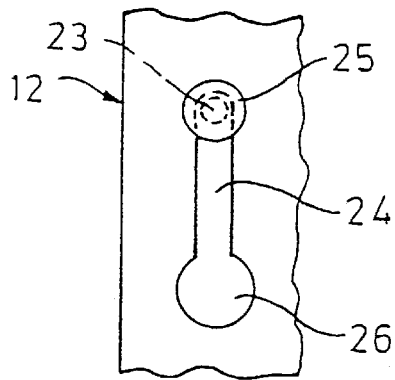
FIG. 2 shows a front view of a partial area of the locking device shown in FIG. 1, on the line indicated by II—II.

For this purpose, the slot-shaped openings 24 are adapted to the particular locking element 23, which is provided with a head part 25, in such a manner that the head part 25 can only be fitted through a corresponding widened section 26 of the corresponding slot-shaped opening 24 in the unlocked position of the blocking element 8, and can only be pulled back out of this opening in this unlocked position. In the locked position of the blocking element 8 (FIG. 2), by contrast, the diameter of the slot-shaped opening 24 is smaller than the diameter of the head part 25 of the locking element 23.

Figure 4:
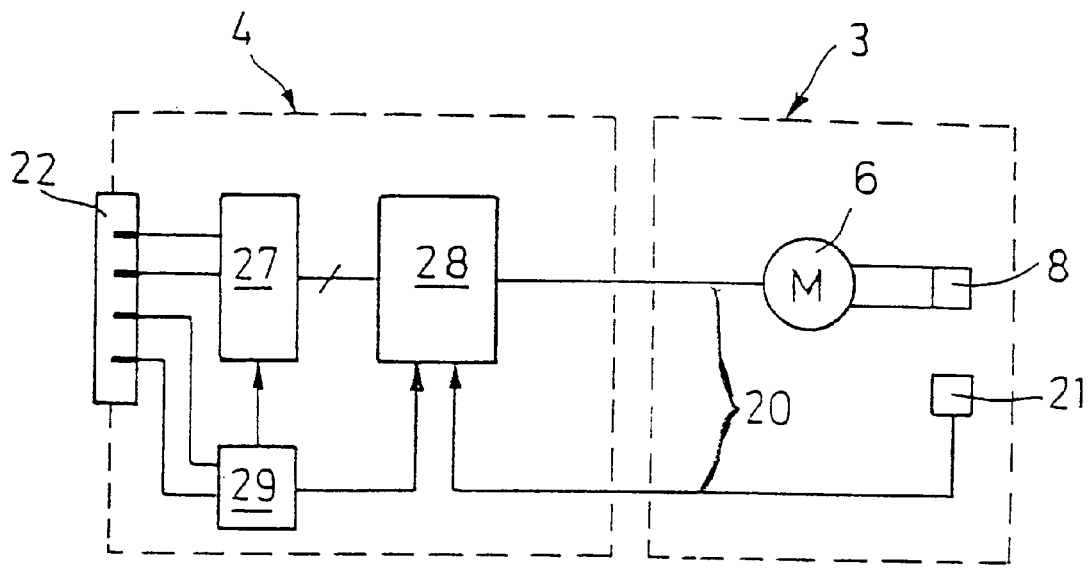
FIG. 4 shows a circuit diagram of the electrical functional elements of the arrangement illustrated in FIG. 1.

FIG. 4 shows a circuit diagram of the electric circuit in the arrangement 1 according to the invention. The switching device 4 essentially comprises an interface card 27 which is connected to the electric motor 6 arranged in the locking device 3 via a microcontroller 28. From corresponding coded signals, the microcontroller 28 not only generates the control signals for the electric motor 6, but also processes the signals from the position sensor 21. In addition, a power supply unit 29 is provided, which supplies the individual subassemblies with power and, for its part, is powered by the vehicle battery or an emergency battery (not shown).

Of course, the invention is not limited to the exemplary embodiment described above. For example, the particular locking element does not necessarily have to be guided through the driver, but rather may also, for example, engage through a slot-shaped opening in the blocking element or in a holding part which is attached to the side of the driver or the blocking element.

Furthermore, the switching device may be designed as a connector. In this case, the printed-circuit board may, for example, be fixed completely in the second housing by means of an insulating potting compound, so that only the electrical contacts project on the side facing toward the locking device.

Moreover, the second housing does not necessarily have to be a completely separate housing. Rather, it is possible for parts of the second housing to be formed by suitably shaped outer walls of the first housing.

Figure 5:
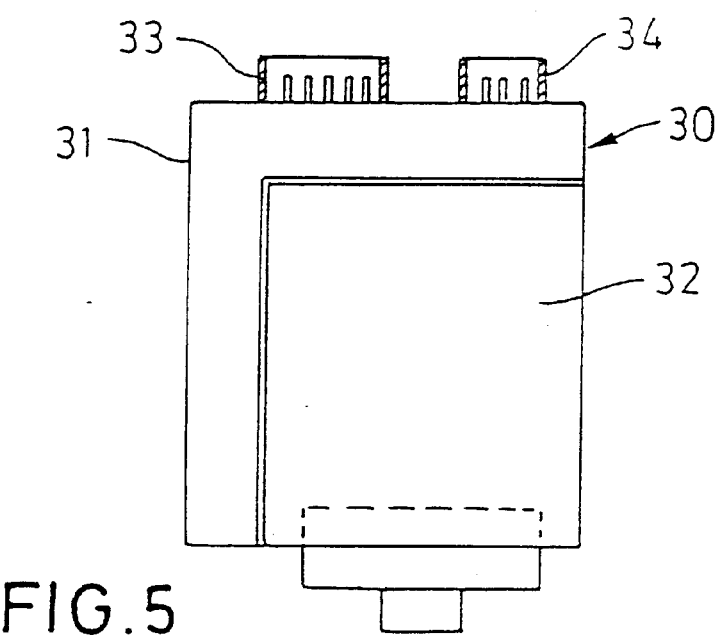
FIG. 5 shows a side view of a further exemplary embodiment of an arrangement according to the invention.

Furthermore, the second housing may surround a plurality of outer walls of the first housing, for example if correspondingly large amounts of space are required for the electronics and/or emergency batteries are to be arranged in the switching device. For example, FIG. 5 shows an arrangement 30 according to the invention, in which the switching device 31 surrounds the locking device 32 in a L shape. Moreover, two different plug connections 33, 34 are formed integrally on the housing of the switching device 31.

LIST OF REFERENCE NUMERALS

1 Arrangement
2 Steering shaft
3 Locking device
4 Switching device
5 First housing
6 Electric motor
7 Spindle drive, actuator
8 Blocking element
9 Toothed ring
10 Threaded spindle
11 Toothed transmission
12 Driver, component
13 Seat
14 Adapter part
15 Component (printed-circuit board)
16 Printed-circuit board
17 Second housing
18, 19 Contacts
20 Electric line
21 Position sensor, subassembly
22 Plug connection
23 Locking element
24 Slot-shaped opening
25 Head part
26 Widened section
27 Interface card
28 Microcontroller
29 Power supply unit
30 Arrangement
31 Switching device
32 Locking device
33, 34 Plug connection

What is claimed is:
1. An arrangement for electrically locking the steering shaft of a motor vehicle steering device comprising:
   a) a locking device having a first housing, in which at least one electric motor with an actuator connected downstream is arranged in order to displace a blocking element which is arranged so that the blocking element can be displaced from an unlocked position into a locked position;

b) an electronic switch, which is provided with contacts and is connected to the electric motor across electric lines and, if appropriate, further electrical and/or electronic subassemblies arranged in the first housing of the locking device;

the switch being attached to the outside of the first housing of the locking device, the electrical contacts of the switch being connectable to corresponding contacts which are arranged on the first housing and are connected to the electric lines.

2. An arrangement according to claim 1, wherein the electrical contacts which are arranged on the switch and on the first housing form a plug connection.

3. An arrangement according to claim 1, wherein the switch is arranged in a second housing which is releasably attached to the first housing.

4. An arrangement according to claim 3, wherein at least one integrally formed plug connection is provided on the second housing, via which connection the switch can be connected to an external power-supply and/or control arrangement.

5. An arrangement according to claim 3, wherein the switch is arranged in the second housing in such a manner that the two units together form a connector which can be plugged onto the contacts arranged on the first housing.

6. An arrangement according to claim 3, wherein the switch and the locking device are connected to one another by at least one locking element and wherein the locking element is secured in the locked position so that the lock element cannot be pulled out, by the blocking element of a component which is connected to the latter.

7. An arrangement for electrically locking the steering shaft of a motor vehicle steering device comprising:

a locking device having a first housing, in which at least one electric motor with an actuator connected downstream is arranged in order to displace a blocking element which is arranged so that the blocking element can be displaced from an unlocked position into a locked position;

an electronic switch, which is provided with contacts and is connected to the electric motor across electric lines and, if appropriate, further electrical and/or electronic subassemblies arranged in the first housing of the locking device;

the switch being attached to the outside of the first housing of the locking device, the electrical contacts of the switch being connectable to corresponding contacts which are arranged on the first housing and are connected to the electric lines, wherein the switch is arranged in a second housing which is releasably attached to the first housing and the switch partly surrounds the locking device in an L shape.

8. An arrangement for electrically locking the steering shaft of a motor vehicle steering device comprising:

a locking device having a first housing, in which at least one electric motor with an actuator connected downstream is arranged in order to displace a blocking element which is arranged so that the blocking element can be displaced from an unlocked position into a locked position;

an electronic switch, which is provided with contacts and is connected to the electric motor across electric lines and, if appropriate, further electrical and/or electronic subassemblies arranged in the first housing of the locking device;

the switch being attached to the outside of the first housing of the locking device, the electrical contacts of the switch being connectable to corresponding contacts which are arranged on the first housing and are connected to the electric lines, wherein:

a) the actuator of the locking device is a spindle drive with a threaded spindle, which is connected via a toothed transmission, and a driver, which is mounted in such a manner that it can be displaced in linear fashion in a guide and has an internal screw thread which engages in the screw thread of the threaded spindle;

b) on a side of the driver facing toward the blocking element, the driver has a seat, by which the blocking element, on a side of the blocking element which is remote from the steering shaft, can be exchangeably connected to the driver; and c) to guide the blocking element, the locking device comprises an adapter part which can be connected to the steering device of the vehicle and is designed in such a manner that, in the event of the steering shaft being violently twisted in the locked position of the blocking element, the adapter part absorbs the forces acting on the steering shaft.

9. An arrangement accordingly to claim 8, wherein the adapter part is arranged exchangeably on the first housing of the locking device.

* * * * *

UNITED STATES PATENT AND TRADEMARK OFFICE
CERTIFICATE OF CORRECTION

PATENT NO.    : 6,354,118 B1
DATED         : March 12, 2002
INVENTOR(S)   : Frick et al.

It is certified that error appears in the above-identified patent and that said Letters Patent is hereby corrected as shown below:

<u>Title page,</u>
Insert -- [30]   Foreign Application Priotity Data --; and
-- Feb. 15, 1999  [DE]  Germany          199 06 267 --.

<u>Column 5,</u>
Line 31, prior "and wherein" insert -- , --.

Signed and Sealed this

Third Day of September, 2002

Attest:

JAMES E. ROGAN
Attesting Officer                    Director of the United States Patent and Trademark Office